United States Patent
Archer et al.

(10) Patent No.: US 7,979,660 B2
(45) Date of Patent: Jul. 12, 2011

(54) PAGING MEMORY CONTENTS BETWEEN A PLURALITY OF COMPUTE NODES IN A PARALLEL COMPUTER

(75) Inventors: Charles J. Archer, Rochester, MN (US); Emily J. Howe, Sunnyvale, CA (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/180,971

(22) Filed: Jul. 28, 2008

(65) Prior Publication Data

US 2010/0023723 A1 Jan. 28, 2010

(51) Int. Cl.
*G06F 12/02* (2006.01)
(52) U.S. Cl. .. 711/165; 711/148; 711/170; 711/E12.002
(58) Field of Classification Search .................. None
See application file for complete search history.

(56) References Cited

U.S. PATENT DOCUMENTS 7,318,076 B2 * 1/2008 Chen et al. ................... 707/204
2010/0185719 A1 * 7/2010 Howard ....................... 709/201

* cited by examiner

*Primary Examiner* — Kevin Verbrugge
(74) *Attorney, Agent, or Firm* — Biggers & Ohanian, LLP

(57) ABSTRACT

Methods, apparatus, and products are disclosed for paging memory contents between a plurality of compute nodes in a parallel computer that includes: identifying, by a master node, a memory allocation request for an application executing on the master node, the memory allocation request requesting additional computer memory for use by the application during execution; requesting, by the master node from a slave node, an available memory notification specifying to the master node the computer memory available for allocation on the slave node; allocating, by the master node, at least a portion of the computer memory available for allocation on the slave node in dependence upon the memory allocation request and the available memory notification; and transferring, by the master node, contents of a portion of the computer memory on the master node to the allocated portion of the computer memory on the slave node.

19 Claims, 12 Drawing Sheets

PAGING MEMORY CONTENTS BETWEEN A PLURALITY OF COMPUTE NODES IN A PARALLEL COMPUTER

BACKGROUND OF THE INVENTION

1. Field of the Invention

The field of the invention is data processing, or, more specifically, methods, apparatus, and products for paging memory contents between a plurality of compute nodes in a parallel computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

In addition to interconnecting the compute nodes together for data communications, such networks may also connect the compute nodes to disk storage to provide for additional storage needs. Such additional storage needs typically include storing pages of memory for a compute node when the compute node's computer memory no longer has enough storage available for those pages. Upon determining that a compute node's available storage space in the node's computer memory has dropped below some threshold or that some of the pages of memory are being utilized infrequently, a compute node may move the physical storage location of those pages from the node's computer memory to disk storage. Moving the location of those pages out of the compute node's main computer memory is referred to as 'paging' the memory contents. When the compute node needs to access those pages of memory from disk storage, the compute node retrieves the pages from disk storage into the node's computer memory. The compute node typically makes space available for the retrieved pages in the node's computer memory by sending other pages of memory to the disk storage. The drawback to storing information in disk storage is that accessing such information is typically associated with high latency. Accessing pages of memory in disk storage, therefore, decreases the overall processing efficiency of the nodes.

SUMMARY OF THE INVENTION

Methods, apparatus, and products are disclosed for paging memory contents between a plurality of compute nodes in a parallel computer. The plurality of compute nodes are connected together for data communications using a data communications network. Each compute node includes computer memory. At least one of the compute nodes operates as a master node, and at least of the compute nodes operates as a slave node. Paging memory contents between a plurality of compute nodes in a parallel computer includes: identifying, by the master node, a memory allocation request for an application executing on the master node, the memory allocation request requesting additional computer memory for use by the application during execution; requesting, by the master node from at least one of the slave nodes, an available memory notification specifying to the master node the computer memory available for allocation on the slave node; allocating, by the master node, at least a portion of the computer memory available for allocation on the slave node in dependence upon the memory allocation request for the application and the available memory notification from the slave node; and transferring, by the master node, contents of a portion of the computer memory on the master node to the allocated portion of the computer memory on the slave node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
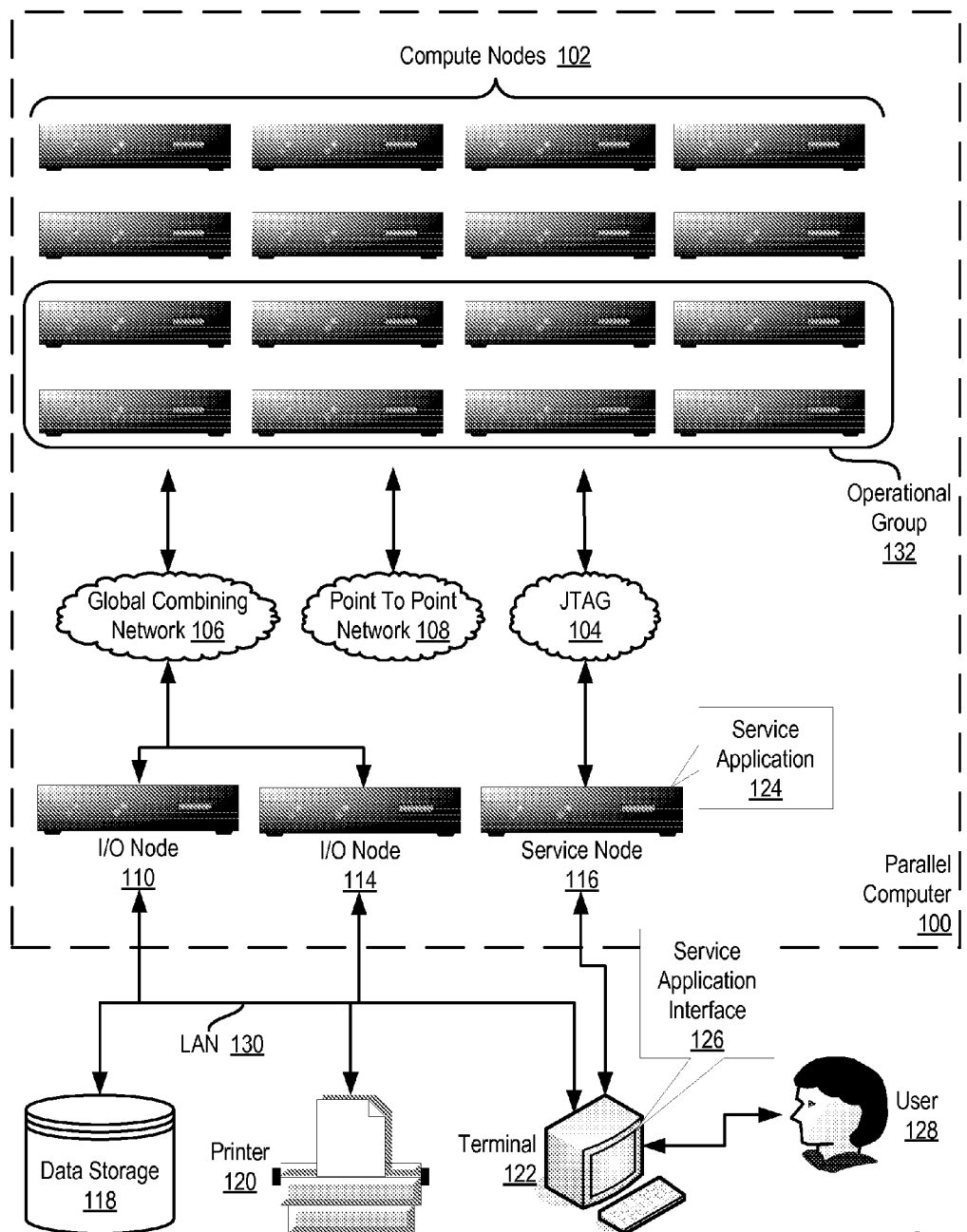
FIG. 1 illustrates an exemplary parallel computer for paging memory contents between a plurality of compute nodes according to embodiments of the present invention.

Exemplary methods, apparatus, and computer program products for paging memory contents between a plurality of compute nodes in a parallel computer according to embodiments of the present invention are described with reference to the accompanying drawings, beginning with FIG. 1. FIG. 1 illustrates an exemplary parallel computer for paging memory contents between a plurality of compute nodes in the parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) for executing an application that processes application data.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*n elements of a given data type, where n is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) in FIG. 1 includes computer program instructions for paging memory contents between a plurality of compute nodes (102) in the parallel computer (100) according to embodiments of the present invention. Each compute node (102) includes computer memory. The plurality of compute nodes (102) are connected together for data communications using a data communications network. At least one of the compute nodes (102) operates as a master node, and at least one of the compute nodes (102) operate as a slave node. The term 'master node' refers to a compute node that utilizes computer memory on another compute node to store information on its behalf. The term 'slave node' refers to a compute node that stores information in the node's computer memory on behalf of a master node.

The parallel computer (100) of FIG. 1 operates generally for paging memory contents between a plurality of compute nodes (102) in the parallel computer (100) according to embodiments of the present invention as follows: The master node identifies a memory allocation request for an application executing on the master node. The allocation request specifies additional computer memory requested by the application for use during execution. The master node requests an available memory notification from at least one of the slave nodes. Each available memory notification specifies to the master node the computer memory available for allocation on the slave node. The master node allocates at least a portion of the computer memory available for allocation on the slave node in dependence upon the allocation request for the application and the available memory notification from the slave node. The master node then transfers contents of a portion of the computer memory on the master node to the allocated portion of the computer memory on the slave node.

Paging memory contents between a plurality of compute nodes (102) in the parallel computer (100) according to embodiments of the present invention typically allows a master node to page memory contents faster than paging memory content to traditional disk storage. The faster paging is typically due to the low latency and high bandwidth associated with inter-node communications through the data communications networks of the parallel computer, particularly the point to point network (108), when compared with the time required to access data storage (118). Enhancing the speed at which paging occurs for a compute node bolsters overall system performance and more efficiently utilizes the compute nodes' memory resources.

The arrangement of nodes, networks, and I/O devices making up the exemplary system illustrated in FIG. 1 are for explanation only, not for limitation of the present invention. Data processing systems capable of paging memory contents between a plurality of compute nodes in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Paging memory contents between a plurality of compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of paging memory contents between a plurality of compute nodes in the parallel computer according to embodiments of the present invention. The compute node (152) of FIG. 2 includes one or more processing cores (164) as well as computer memory (156) implemented, for example, as random access memory ('RAM'). The processing cores (164) are connected to computer memory (156) through a high-speed memory bus (154) and through a bus adapter (194) and an extension bus (168) to other components of the compute node (152). Stored in computer memory (156) of FIG. 2 is an application (158), a module of computer program instructions that carries out parallel, user-level data processing using parallel algorithms.

Also stored in computer memory (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library. Also stored in computer memory (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
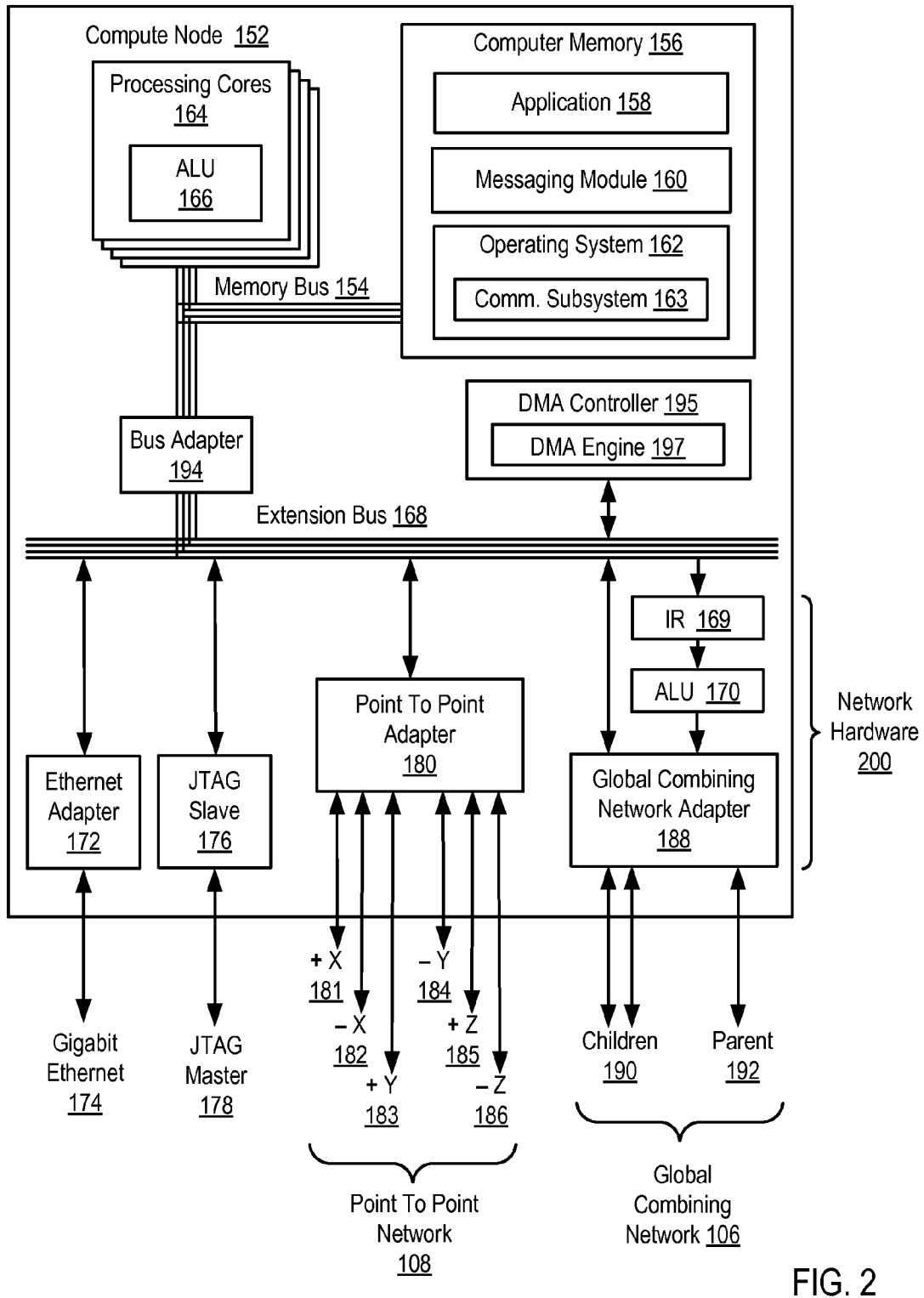
FIG. 2 sets forth a block diagram of an exemplary compute node useful in a parallel computer capable of paging memory contents between a plurality of compute nodes according to embodiments of the present invention.

The operating system (162) of FIG. 2 includes computer program instructions capable of paging memory contents between a plurality of compute nodes in a parallel computer according to embodiments of the present invention. The plurality of compute nodes are connected together for data communications using a data communications network. At least one of the compute nodes operates as a master node, and at least one of the compute nodes operate as a slave node. The compute node (152) of FIG. 2 operates as a master node because compute node (152) utilizes available computer memory on other compute nodes to store information on its behalf. The operating system (162) operates generally for paging memory contents between a plurality of compute nodes in a parallel computer according to embodiments of the present invention by: identifying a memory allocation request for the application (158) executing on the master node, the allocation request specifying additional computer memory requested by the application for use during execution; requesting, from at least one of the slave nodes, an available memory notification specifying to the master node the computer memory available for allocation on the slave node; allocating at least a portion of the computer memory available for allocation on the slave node in dependence upon the allocation request for the application and the available memory notification from the slave node; and transferring contents of a portion of the computer memory on the master node to the allocated portion of the computer memory on the slave node.

The operating system (162) of FIG. 2 includes a communications subsystem (163). The communications subsystem (163) of FIG. 2 provides communications between the operating system (162) and the operating systems installed on other compute nodes of the parallel computer. That is, the operating system (162) utilizes the communications subsystem (163) to perform inter-operating system communications across the network. Using the communications subsystem (163), the operating system may request and receive an available memory notification from the operating systems installed on one or more slave nodes, notify the operating systems on the slave nodes that the operating system (162) has allocated a portion of those node's computer memory, and transfer memory contents between computer memory of the compute node (152) and the slave nodes. The communications subsystem (163) of FIG. 2 performs such inter-operating system communications using various network hardware components such as, for example, communications adapters (180, 188).

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for paging memory contents between a plurality of compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in paging memory contents between a plurality of compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
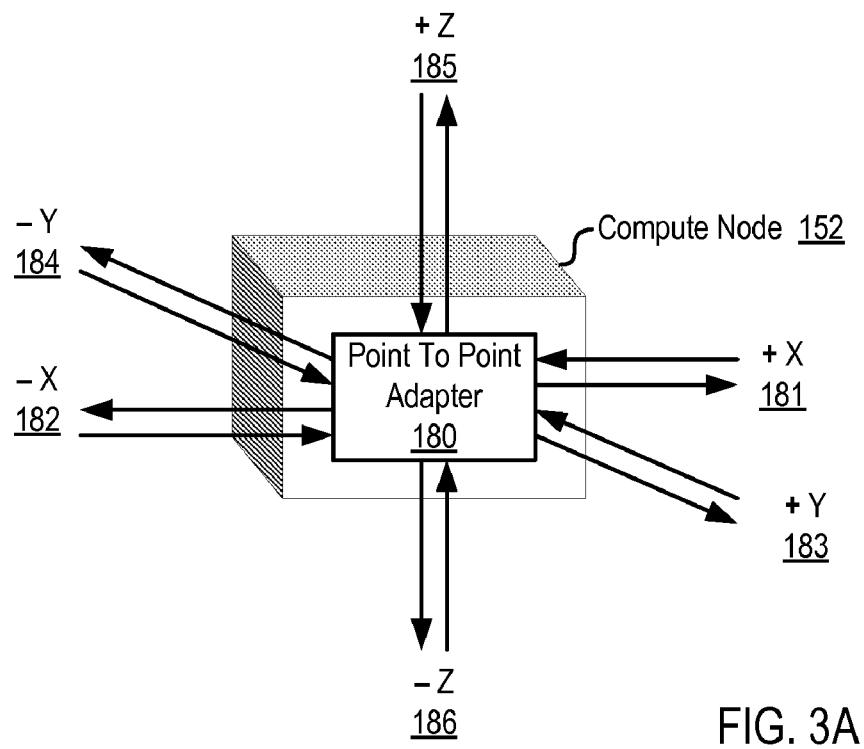
FIG. 3A illustrates an exemplary Point To Point Adapter useful in a parallel computer capable of paging memory contents between a plurality of compute nodes according to embodiments of the present invention.

For further explanation, FIG. 3A illustrates an exemplary Point To Point Adapter (180) useful in a parallel computer capable of paging memory contents between a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
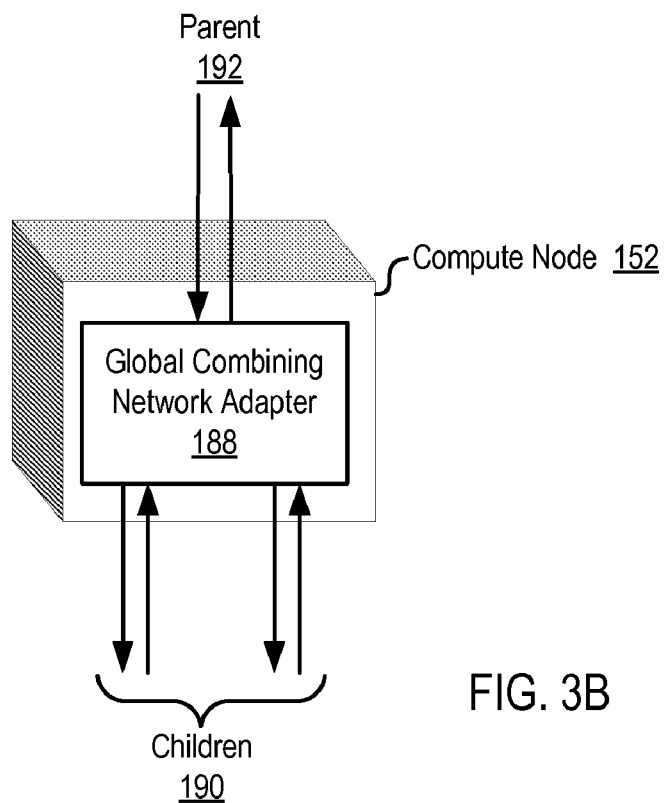
FIG. 3B illustrates an exemplary Global Combining Network Adapter useful in a parallel computer capable of paging memory contents between a plurality of compute nodes according to embodiments of the present invention.

For further explanation, FIG. 3B illustrates an exemplary Global Combining Network Adapter (188) useful in a parallel computer capable of paging memory contents between a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
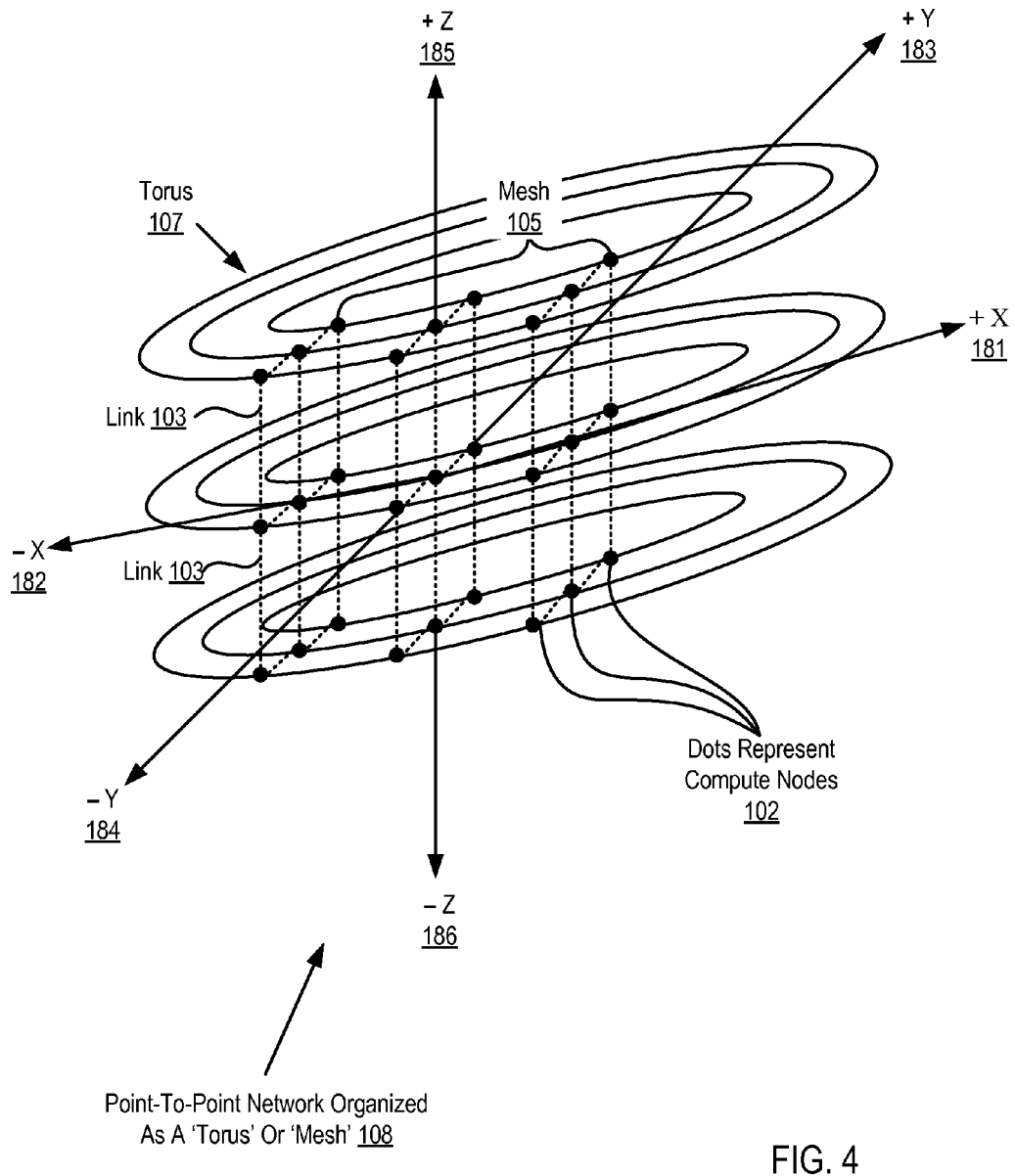
FIG. 4 sets forth a line drawing illustrating an exemplary data communications network optimized for point to point operations useful in a parallel computer capable of paging memory contents between a plurality of compute nodes according to embodiments of the present invention.

For further explanation, FIG. 4 sets forth a line drawing illustrating an exemplary data communications network (108) optimized for point to point operations useful in a parallel computer capable of paging memory contents between a plurality of compute nodes in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in paging memory contents between a plurality of compute nodes in a parallel computer in accordance with embodiments of the present invention may contain only a few compute nodes or may contain thousands of compute nodes.

Figure 5:
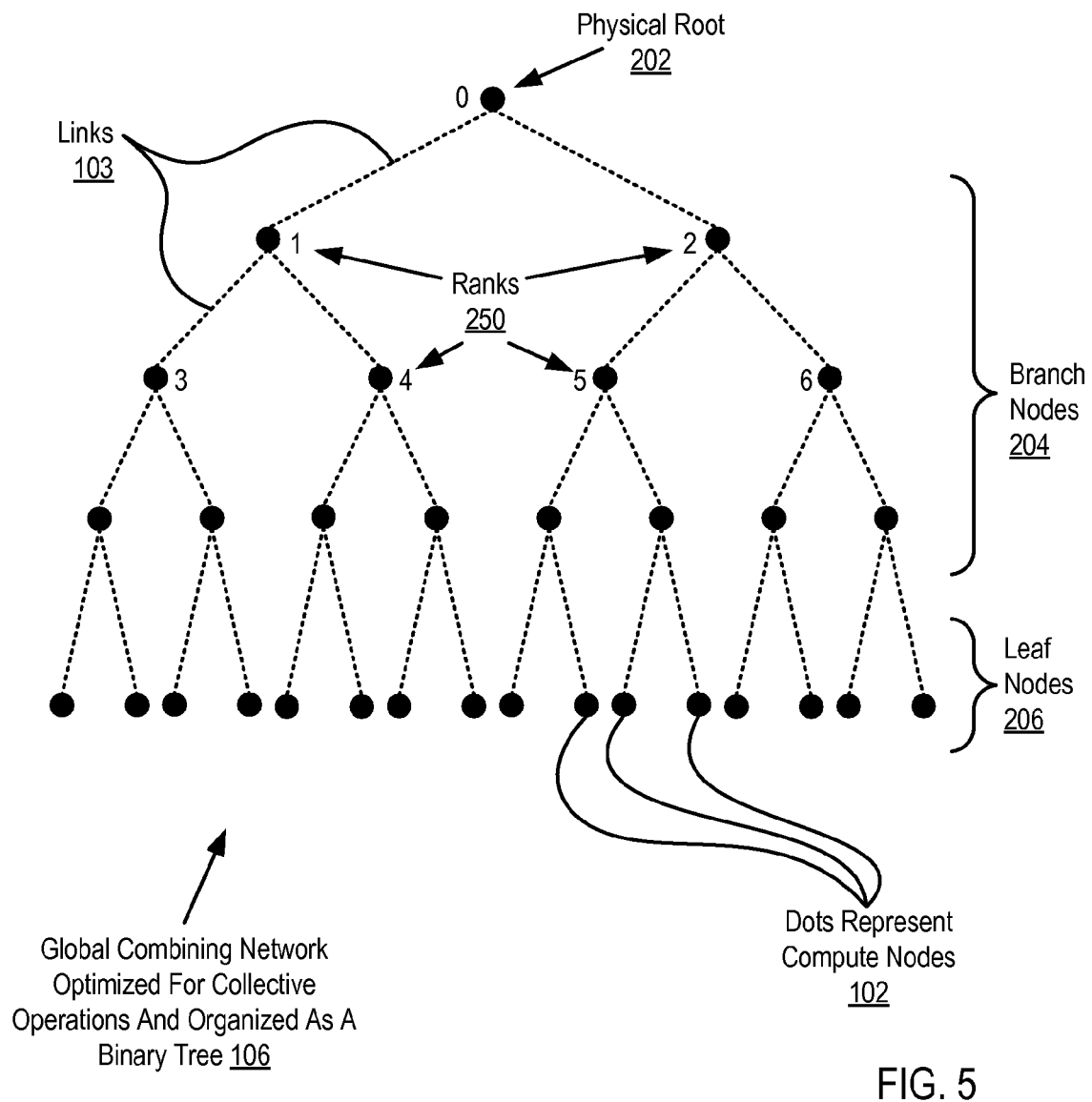
FIG. 5 sets forth a line drawing illustrating an exemplary data communications network optimized for collective operations useful in a parallel computer capable of paging memory contents between a plurality of compute nodes according to embodiments of the present invention.

For further explanation, FIG. 5 sets forth a line drawing illustrating an exemplary data communications network (106) optimized for collective operations useful in a parallel computer capable of paging memory contents between a plurality of compute nodes in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for paging memory contents between a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
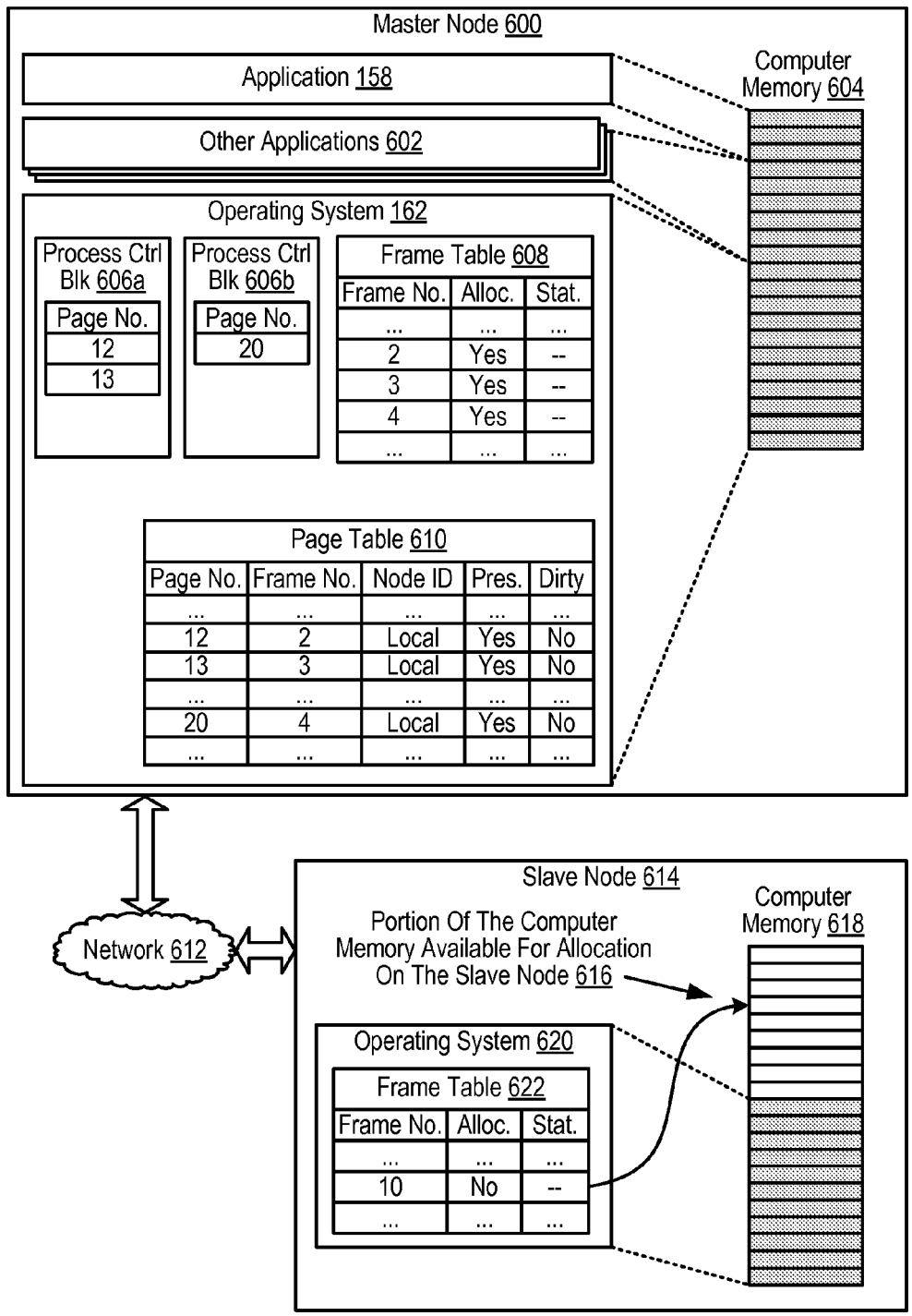
FIG. 6A sets forth a block diagram illustrating an exemplary master node and an exemplary slave node useful in paging memory contents between a plurality of compute nodes in a parallel computer according to embodiments the present invention.

For further explanation, FIG. 6A sets forth a block diagram illustrating an exemplary master node and an exemplary slave node useful in paging memory contents between a plurality of compute nodes in a parallel computer according to embodiments the present invention. The compute nodes (600, 614) in FIG. 6A are connected together for data communications using a data communications network (612). Compute node (600) operates as a master node (600), and compute node (614) operates as a slave node (614). To provide storage for information processed by the nodes, each compute node includes computer memory. The master node (600) includes computer memory (604), and the slave node (614) includes computer memory (618). The computer memory for each compute node may be implemented using random access memory mounted on memory module, which in turn are connected to the other components of each compute node.

In the example of FIG. 6A, the master node (600) executes an application (158) along with other applications (602). To execute the application (158) and the other applications (602), the operating system (162) of FIG. 6A creates a process control block (606) for each application (158, 602). A process control block ('PCB') is a data structure in the operating system kernel that contains the information needed to manage a particular process, which is an executable version of an application. In such a way, the PCB is the structure that represents a process to the operating system (162). Though implementations differ, a PCB typically specifies: a process identifier ('PID') for the process; register values for the process such as, for example, the program counter value; the address space for the process; the priority of the process; process execution information such as, for example, when the process was last executed by the processor, how much execution time the process has accumulated, and so on; the pointer to the PCB of the next process to execute; and I/O information such as, for example, identifiers for the I/O devices allocated to the process, a list of opened files, and so on. In the example of FIG. 6A, process control block (606a) corresponds with application (158), and process control block (606b) corresponds with one of the other application (602). Readers will note that only two process control blocks are illustrated in FIG. 6A, but the operating system may manage many PCBs during operation.

For the master node (600) to execute the applications (158, 602) and the operating system (162), the operating system (162) allocates a portion of the master node's computer memory (604) to each application and to itself. The operating system (162) may allocate memory to itself and the application (158, 602) by assigning each process a number of pages in virtual memory and associating those virtual memory pages with frames of physical computer memory. A virtual memory page represents a set of data referenced by a set contiguous virtual memory addresses. A frame represents a set of contiguous physical memory locations referenced using a set of contiguous physical memory addresses. Often, the size of the virtual memory page is the same size as a frame because frames are utilized to store virtual memory pages.

In the example of FIG. 6A, the operating system (162) assigns virtual memory pages to each application by storing the page numbers of virtual memory pages in the process control block (606) corresponding to that application. In FIG. 6A, for example, the operating system (162) allocates virtual memory pages 12 and 13 to the application (158) by storing those page identifiers in process control block (606a). The operating system (162) allocates virtual memory page 20 to one of the other applications (602) by storing that page identifier in process control block (606b).

The operating system (162) associates virtual memory pages assigned to the various processes running on the master node (600) with frames of physical computer memory using a page table (610). The page table (610) is used by a virtual memory system in the operating system (162) to store a mapping between virtual memory addresses and physical memory addresses. The mapping between virtual addresses and physical addresses in the example of FIG. 6A is represented by virtual address page numbers and physical address frame numbers respectively. In the example of FIG. 6A, the page table (610) includes a node identifier field that specifies the particular compute node on which the frame of physical memory is located that stores the contents of the associated virtual memory page. A value of 'Local' indicates that the associated frame of physical memory is located on the master node (600) in computer memory (604). Any other value may specify the rank of slave node on which the associated frame of physical memory is located. The page table (610) of FIG. 6A also includes additional information about each virtual memory page, such as, for example, whether the memory page is presently stored in the master node's computer memory (604). Whether the page is presently stored in the master node's computer memory (604) is represented in this example by a present bit on each entry in the page table (610). The example page table (610) of FIG. 6A also includes, in the form of a dirty bit, an indication whether a page has been modified after the page was loaded into the node's computer memory (604) from disk storage or the computer memory of a slave node. A memory page that has been modified is written back to a disk or a slave node in order to preserve any changes. Readers will note that the exemplary page table (610) of FIG. 6A is for explanation and not for limitation. Other page tables having other formats as will occur to those of skill in the art may also be useful in paging memory contents between a plurality of compute nodes in a parallel computer according to embodiments of the present invention.

In the example of FIG. 6A, the page table (610) associates pages number 12 with frame number 2 in the master node's computer memory (604) and pages number 13 with frame number 3 in the master node's computer memory (604). Because process control block (606a) assigns page numbers 12 and 13 to application (158), the operating system (162) uses the page table (610) to allocate frames 2 and 3 of the node's computer memory (604) to the application (158). The page table (610) of FIG. 6A also associates page number 20 with frame number 4 on the master node's computer memory (604). Because process control block (606b) assigns page number 20 to one of the other applications (602), the operating system (162) uses the page table (610) to allocate frame 4 of the node's computer memory (604) to that other application (602).

The operating system (162) of FIG. 6A also includes a frame table (608). Much like the page table (610) records which frames are mapped to which virtual memory pages, the frame table (608) records which frames of the master node's computer memory are free to be mapped to pages of virtual memory. The frame table (608) specifies whether a particular frame is available for allocation using an allocated bit. A frame of physical memory is allocated when the frame is mapped to a page of virtual memory, and a frame of physical memory is unallocated when the frame is not mapped to a page of virtual memory. In FIG. 6A, for example, the allocated bit associated with frames 2, 3, and 4 is set to a value representing 'Yes,' which indicates that those frame are allocated in the page table (610) to pages of virtual memory. In some operating systems the frame table may also hold additional information, such as, for example, statistical information, or other background information. Such statistical information may be implemented as, for example, the number of times that a frame is accessed, an indication of when the frame was last accessed, and so on. The statistical information may be stored in the frame table's statistics field. Readers will note that the exemplary frame table of FIG. 6A is for explanation and not for limitation. Other frame tables having other formats as will occur to those of skill in the art may also be useful in paging memory contents between a plurality of compute nodes in a parallel computer according to embodiments of the present invention.

In the example of FIG. 6A, the operating system (162) has allocated all of the computer memory (604) of the master node (600) to itself, the application (158), and the other applications (602). FIG. 6A illustrates that the master node (600) has no more available computer memory for allocation by depicting all of the master node's computer memory (604) with a grey background.

In contrast to the master node (600), readers will note that a portion (616) of the slave node's computer memory (618) available for allocation. Specifically, the slave node's frame table (622) indicates that frame 10 in the slave node's computer memory (618) is available for allocation. FIG. 6A illustrates the available portion (616) of the slave node's computer memory (618) by depicting that portion (616) with a white background. The operating system (620) of the slave node (614) has allocated the remaining portion of the slave node's computer memory (618) to itself, which is depicted in FIG. 6A with grey background.

In the example of FIG. 6A, the master node's operating system (162) identifies a memory allocation request for the application (158) executing on the master node (158). The memory allocation request requests additional computer memory for use by the application (158) during execution. For example, the memory allocation request may specify that the application (158) requests an additional megabyte of RAM. As mentioned above, however, the master node (600) does not have any available computer memory (604) because all the frames of the master node's memory (604) are already allocated to various pages in the page table (610). Thus, the master node (600) requests an available memory notification from the slave node (614) that specifies to the master node (600) the computer memory (618) available for allocation on the slave node (614). The slave node (614) in turn provides the master node (600) with the available memory notification that specifies the frames of computer memory (618) available on the slave node (614). Using the memory allocation request for the application (158) and the available memory notification from the slave node (614), the master node (600) then allocates at least a portion of the computer memory (618) available for allocation on the slave node (614) to either the application (158) requesting the additional memory or some other application (602). When the master node (600) allocates the slave node's available memory to an application (602) other than the requesting application (158), a portion of the master node's memory utilized by that other application (602) is freed up for use by the application (158) requesting the additional computer memory.

Figure 6B:
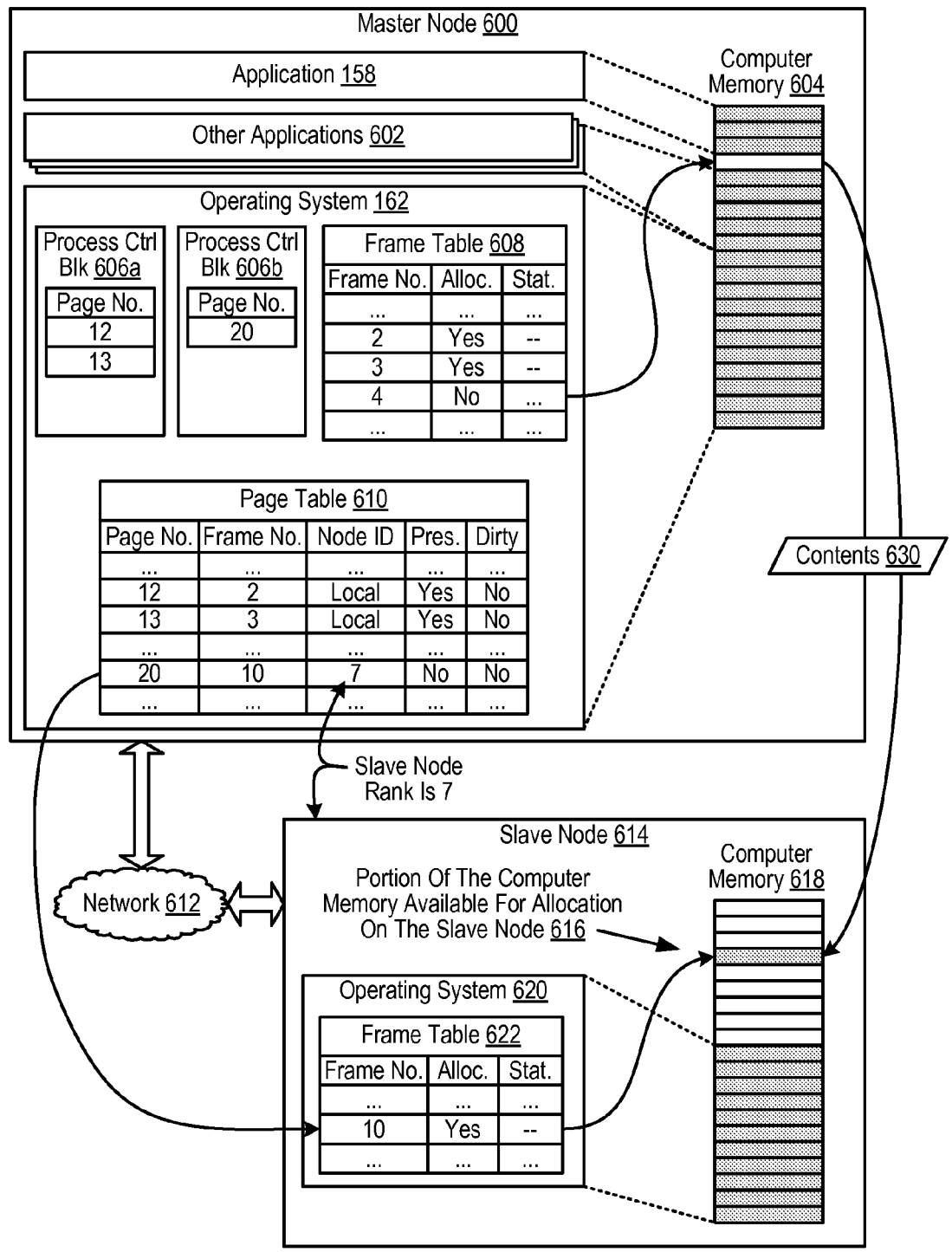
FIG. 6B sets forth a block diagram illustrating the exemplary master node and the exemplary slave node of FIG. 6A after the exemplary master node allocates at least a portion of the computer memory available for allocation on the slave node according to embodiments the present invention.

For further explanation, FIG. 6B sets forth a block diagram illustrating the exemplary master node and the exemplary slave node of FIG. 6A after the exemplary master node allocates at least a portion of the computer memory available for allocation on the slave node according to embodiments of the present invention. Further consider that the application (158) requested an additional frame of computer memory. To accommodate the application's memory allocation request, the master node (600) of FIG. 6B allocates frame 10 in the slave node's computer memory (618) to one of the other applications (602) executing on the master node (600). The master node (600) allocates frame 10 in the slave node's computer memory (618) by associating frame 10 to virtual memory page 20 in the master node's page table (610). The master node indicates that frame 10 is located on slave node (614) by storing the slave node's rank value of 7 in the node identifier field of the page table (610). Readers will recall that virtual memory page 20 is assigned to one of the other application (602) in process control block (606b). Because virtual page 20 was previously associated with frame 4, the master node (600) transfers the contents (630) of frame 4 in the master node's computer memory (604) to frame 10 in the slave node's computer memory (618). In such a manner, frame 4 in the master node's computer memory (604) becomes available for allocation to the application (158) requesting additional computer memory. FIG. 6B illustrates that frame 4 is available for allocation in that the master node's frame table (608) specifies that frame 4 is unallocated and frame 4 in computer memory (604) is depicted with a white background. FIG. 6B illustrates that frame 10 in the slave node's computer memory (618) is now unavailable for allocation in that the slave node's frame table (622) specifies that frame 10 is currently allocated and frame 10 in computer memory (618) is depicted with a grey background.

Figure 6C:
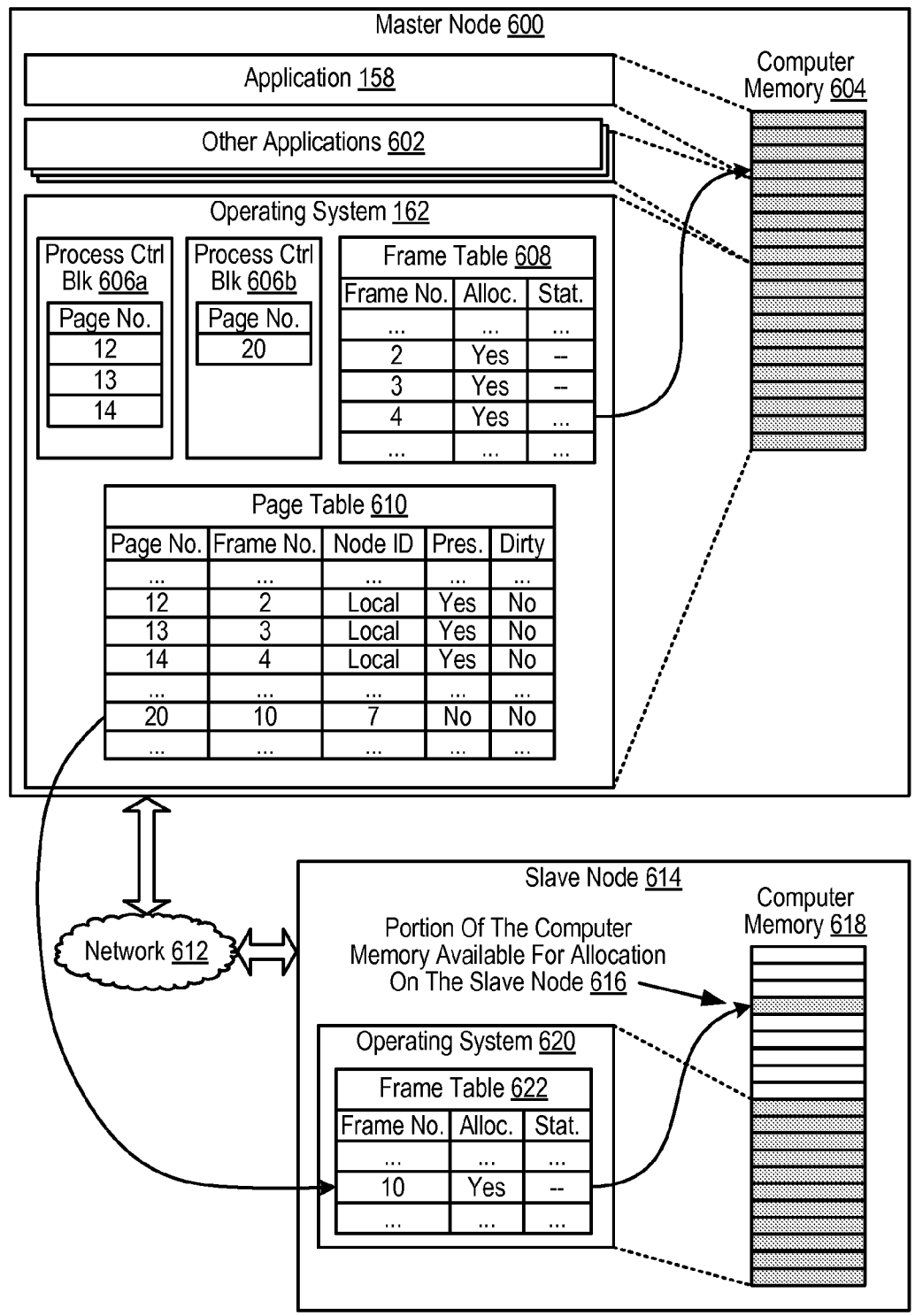
FIG. 6C sets forth a block diagram illustrating the exemplary master node and the exemplary slave node of FIG. 6B after the exemplary master node satisfies the memory allocation request for the application requesting additional computer memory for use by the application during execution according to embodiments the present invention.

Turning now to FIG. 6C, FIG. 6C sets forth a block diagram illustrating the exemplary master node and the exemplary slave node of FIG. 6B after the exemplary master node satisfies the memory allocation request for the application requesting additional computer memory for use by the application during execution according to embodiments the present invention. The master node (600) allocates the additional computer memory to the application (158) by assigning an additional virtual memory page 14 to the application (158) through the process control block (606a) and associating virtual memory page 14 with frame 4 of the master node's computer memory (604) in the page table (610). The master node's frame table (608) in FIG. 6C now specifies that frame 4 is allocated, and FIG. 6C depicts frame 4 in computer memory (604) with a grey background.

Figure 7:
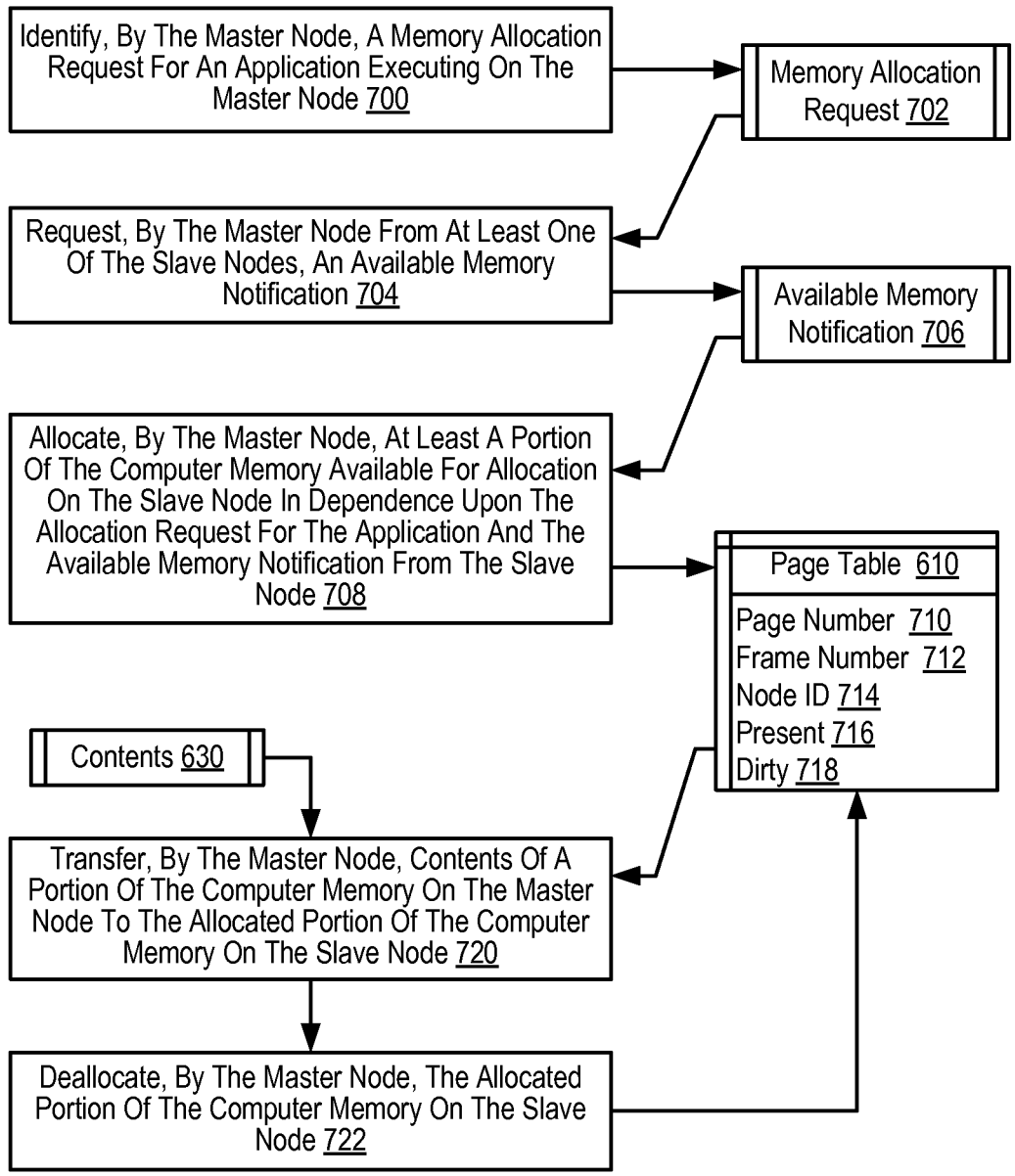
FIG. 7 sets forth a flow chart illustrating an exemplary method for paging memory contents between a plurality of compute nodes in a parallel computer according to embodiments the present invention.

For further explanation, FIG. 7 sets forth a flow chart illustrating an exemplary method for paging memory contents between a plurality of compute nodes in a parallel computer according to embodiments the present invention. The plurality of compute nodes connected together for data communications using a plurality of data communications networks. At least one of the data communications networks is optimized for point to point operations, and at least one of the data communications networks is optimized for collective operations. At least one of the compute nodes operates as a master node, and at least one of the compute nodes operates as a slave node. Each compute node includes computer memory typically implemented using random access memory.

The method of FIG. 7 includes identifying (700), by the master node, a memory allocation request (702) for an application executing on the master node. The memory allocation request (702) of FIG. 7 represents a request for additional computer memory for use by the application during execution. The memory allocation request (702) of FIG. 7 specifies the amount of additional memory requested by the application. The master node may identify (700) a memory allocation request (702) for the application according to the method of FIG. 7 by receiving an instruction from the application to allocate memory for a specific variable or object utilized by the application. In some other embodiments, the master node may identify (700) a memory allocation request (702) for the application according to the method of FIG. 7 when the application invokes a memory allocation function of the operating system such as, for example, a 'malloc( )' function.

The method of FIG. 7 also includes requesting (704), by the master node from at least one of the slave nodes, an available memory notification (706) specifying to the master node the computer memory available for allocation on the slave node. The available memory notification (706) of FIG. 7 represents a slave node's description of the slave node's computer memory that is available for allocation. Depending on the particular embodiments, the available memory notification (706) of FIG. 7 may specify the physical addresses or frames available on the slave node or may simply specify the amount of available memory on the slave node. The master node may request (704) the available memory notification (706) according to the method of FIG. 7 by broadcasting a request to the slave nodes using an 'MPI_BCAST' collective broadcast operation and receiving the available memory notification (706) from each of the slave nodes as part of an 'MPI_SEND' point to point operation. Readers will note that the master node may request (704) the available memory notification (706) from each of the slave nodes in response to the memory allocation request (702), or the master node may periodically request (704) the available memory notification (706) from each of the slave nodes to maintain current information about the memory available for each node.

The method of FIG. 7 includes allocating (708), by the master node, at least a portion of the computer memory available for allocation on the slave node in dependence upon the memory allocation request (702) for the application and the available memory notification (706) from the slave node. The master node may allocate (708) at least a portion of the computer memory available for allocation on the slave node according to the method of FIG. 7 by determining the number of frames required to satisfy the memory allocation request (702), selecting that number of frames from the slave node for allocation from the frames specified by the slave node's available memory notification (706), and associating in the master node's page table (610) the selected slave node frames with the pages assigned to one of the applications executing on the master node. The master node may then notify the slave node which frames the master node selected so that the slave node may update that slave node's frame table to indicate those selected frames are now allocated by the master node. Readers will note that the memory on the slave node selected for allocation is not necessarily allocated to the application requesting the additional memory. The master node may often allocate memory on a slave node to one of the applications having a low execution priority or to an application that is infrequently utilized. After moving the contents of the master node's memory previously allocated to the low priority or infrequently utilized application to the slave node's memory now allocated to the low priority or infrequently utilized application, the master node may then allocate the memory on the master node that was previously allocated to the low priority or infrequently utilized application to the application requesting the additional computer memory.

As mentioned above, the master node uses the page table (610) to associate virtual memory pages assigned to the various applications running on the master node with frames of physical computer memory on the master node and one the slave nodes. Each record of the page table (610) in FIG. 6A includes a page number field (710), a frame number field (712), a node identifier field (714), a present bit field (716), and a dirty bit field (718). The page number field (710) specifies a particular page of virtual memory. The frame number field (712) specifies a particular frame of physical memory on a compute node. The node identifier field (714) specifies the particular node on which the associated frame is located. The present bit field (716) indicates whether the associated page is presently stored in the master node's computer memory or stored elsewhere on a slave node or disk storage. The dirty bit field (718) indicates whether a page has been modified after the page was loaded into the master node's computer memory from disk storage or the computer memory of a slave node. Readers will note that the exemplary page table (610) of FIG. 7 is for explanation and not for limitation. Other page tables having other formats as will occur to those of skill in the art may also be useful in paging memory contents between a plurality of compute nodes in a parallel computer according to embodiments of the present invention.

The method of FIG. 7 also includes transferring (720), by the master node, contents (630) of a portion of the computer memory on the master node to the allocated portion of the computer memory on the slave node. The contents (630) of FIG. 7 represent information stored on the master node for the application to which the slave node's memory is allocated. For example, when the master node allocates the slave node's computer memory to the application requesting the additional storage space, the contents (630) represents data for that application. When the master node allocates the slave node's computer memory to an application other than the application requesting the additional storage space, the contents (630) represents data for that other application. The master node may transfer (720) the contents (630) to the allocated portion of the computer memory on the slave node according to the method of FIG. 7 by retrieving the contents (630) from frames of the master node's computer memory for the application to which the master node allocated a portion of the slave node's computer memory, transmitting the contents (630) to the slave node's operating system through the network for storage in the frames of the slave node's computer memory, and updating the master node's page table to indicate the location of the contents (630) on the slave node.

Because execution of at least some of the applications on the master node will eventually end, the master node may eventually have enough unallocated memory that the master node no longer needs to utilize any of the slave node's computer memory to satisfy the master node's memory needs. Thus, the method of FIG. 7 includes deallocating (722), by the master node, the allocated portion of the computer memory on the slave node. The master node may deallocate (722) the allocated portion of the slave node's computer memory according to the method of FIG. 7 by allocating a similar amount of computer memory on the master node, transferring the contents stored in the allocated portion of the slave node's computer memory to the newly allocated portion of the master node's computer memory, updating the master node's page table (610) to reflect the new location of the content, and instructing the slave node that the allocation portion of memory on the slave node may be released. The slave node may release the allocation portion of the slave node's memory by updating the value of the allocated bit in the slave node's frame table for the pertinent frames of computer memory.

In the data communications network that connects compute nodes in the parallel computer, some slave nodes may be located closer to the master node in the network topology than other slave nodes. Accordingly, the master node may select slave nodes to store information on the master node's behalf based on the nodes' location in the network topology. For further explanation, FIG. 8 sets forth a flow chart illustrating a further exemplary method for paging memory contents between a plurality of compute nodes in a parallel computer according to embodiments the present invention. The plurality of compute nodes connected together for data communications using a plurality of data communications networks. At least one of the data communications networks is optimized for point to point operations, and at least one of the data communications networks is optimized for collective operations. At least one of the compute nodes operates as a master node, and at least one of the compute nodes operates as a slave node. Each compute node includes computer memory typically implemented using random access memory.

Figure 8:
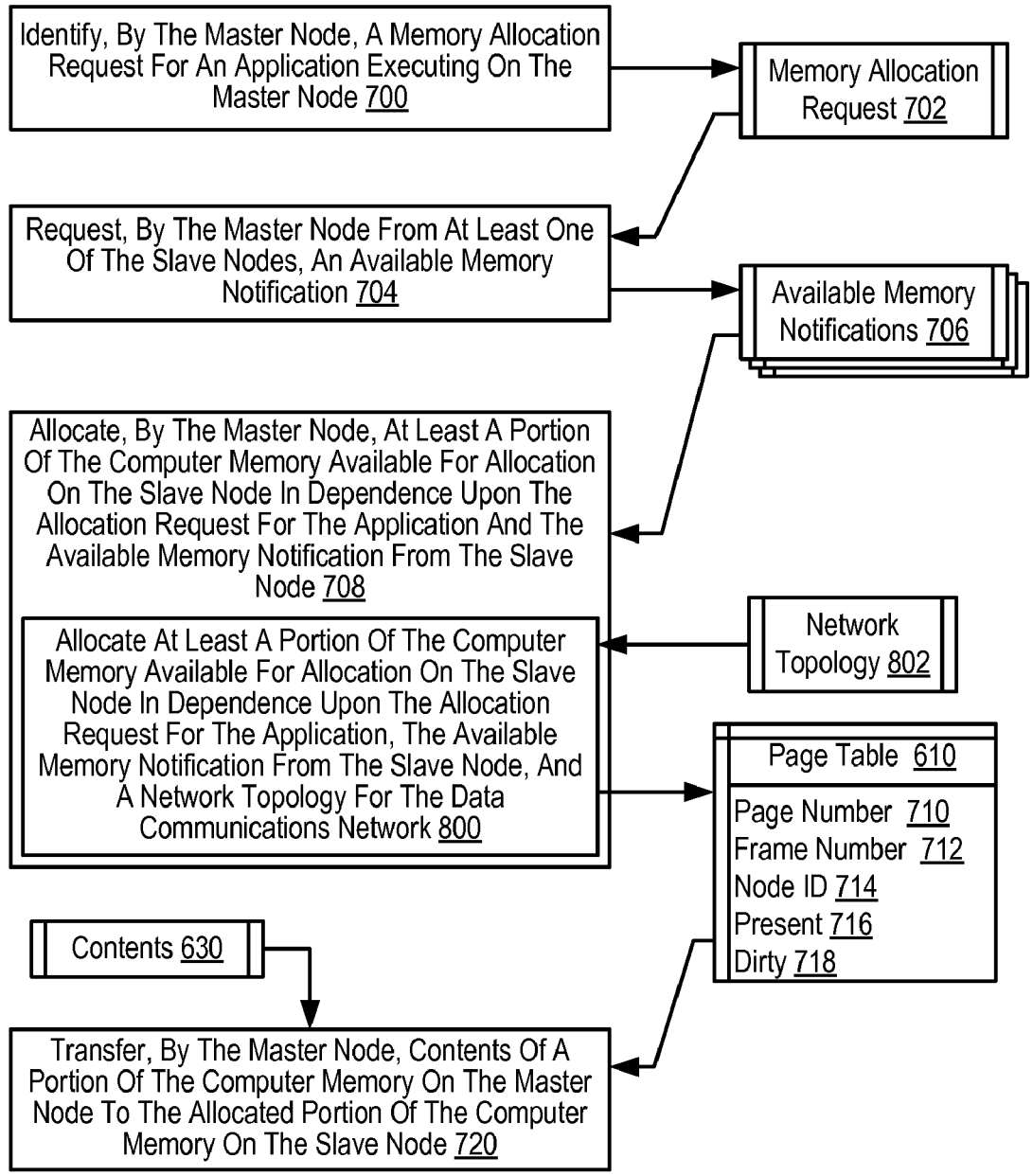
FIG. 8 sets forth a flow chart illustrating a further exemplary method for paging memory contents between a plurality of compute nodes in a parallel computer according to embodiments the present invention.

The method of FIG. 8 is similar to the method of FIG. 7. That is, the method of FIG. 8 includes: identifying (700), by the master node, a memory allocation request (702) for an application executing on the master node, the memory allocation request (702) requesting additional computer memory for use by the application during execution; requesting (704), by the master node from at least one of the slave nodes, an available memory notification (706) specifying to the master node the computer memory available for allocation on the slave node; allocating (708), by the master node, at least a portion of the computer memory available for allocation on the slave node in dependence upon the memory allocation request (702) for the application and the available memory notification (706) from the slave node; and transferring (720), by the master node, contents (630) of a portion of the computer memory on the master node to the allocated portion of the computer memory on the slave node. The example of FIG. 8 is also similar to the example of FIG. 7 in that the example of FIG. 8 includes a page table (610) for use by the master node in allocating (708) at least a portion of the computer memory available for allocation on the slave node. Each record of the page table (610) in FIG. 8 also includes a page number field (710), a frame number field (712), a node identifier field (714), a present bit field (716), and a dirty bit field (718).

In the example of FIG. 8, allocating (708), by the master node, at least a portion of the computer memory available for allocation on the slave node includes allocating (800) at least a portion of the computer memory available for allocation on the slave node in dependence upon the memory allocation request for the application, the available memory notification from the slave node, and a network topology (802) for the data communications network. The network topology (802) of FIG. 8 represents the arrangement of the compute nodes and the inter-node connections in the data communications network. The master node may retrieve the network topology (802) from a service node of the parallel computer such as, for example, the service node described above with reference to FIG. 1. The master node may allocate (800) at least a portion of the computer memory available for allocation on the slave node according to the method of FIG. 8 by determining the number of frames required to satisfy the memory allocation request (702), selecting the slave node closest to the master node in the network topology (802) that has the required number of available frames, selecting that number of frames for allocation from the selected slave node from the frames specified by the selected slave node's available memory notification (706), and associating in the master node's page table (610) the selected slave node frames with the pages assigned to one of the applications executing on the master node. The master node may then notify the selected slave node which frames the master node selected so that the slave node may update that slave node's frame table to indicate those selected frames are now allocated by the master node. In lieu of selecting the slave node closest to the master node, the master node may also use the network topology (802) to select the slave node in the area of the network for which the master node experiences the lowest communications delays.

FIGS. 6 and 7 describe the master node allocating computer memory on a single slave node. Readers will note, however, that the master node may utilize computer memory across multiple compute nodes to satisfy memory allocation requests of applications executing on the master node. For further explanation, FIG. 9 sets forth a flow chart illustrating a further exemplary method for paging memory contents between a plurality of compute nodes in a parallel computer according to embodiments the present invention. The plurality of compute nodes connected together for data communications using a plurality of data communications networks. At least one of the data communications networks is optimized for point to point operations, and at least one of the data communications networks is optimized for collective operations. At least one of the compute nodes operates as a master node, and four of the compute nodes operate as slave nodes (906). Each compute node includes computer memory typically implemented using random access memory.

Figure 9:
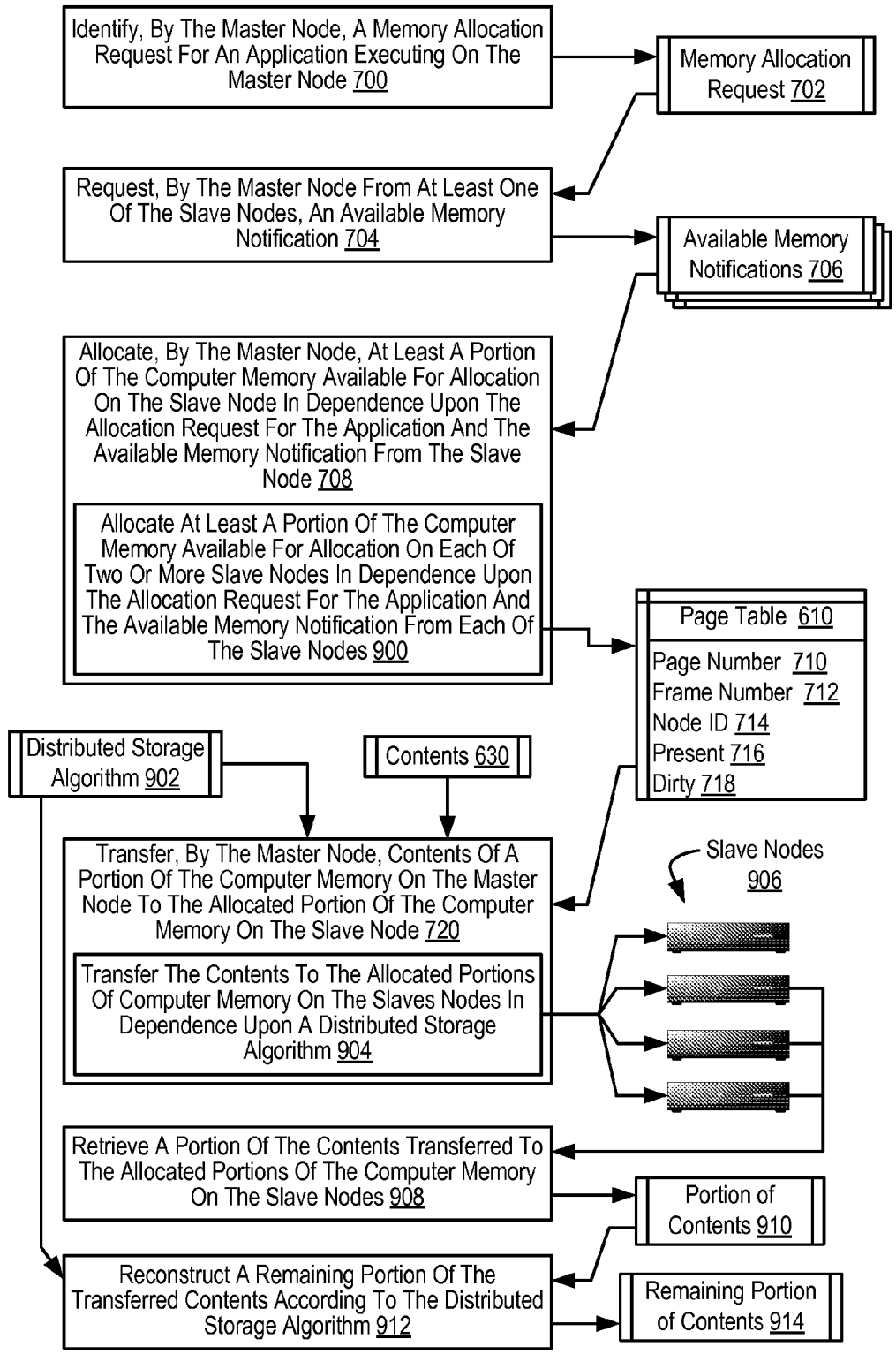
FIG. 9 sets forth a flow chart illustrating a further exemplary method for paging memory contents between a plurality of compute nodes in a parallel computer according to embodiments the present invention.

The method of FIG. 9 is similar to the method of FIG. 7. That is, the method of FIG. 9 includes: identifying (700), by the master node, a memory allocation request (702) for an application executing on the master node, the memory allocation request (702) requesting additional computer memory for use by the application during execution; requesting (704), by the master node from at least one of the slave nodes, an available memory notification (706) specifying to the master node the computer memory available for allocation on the slave node; allocating (708), by the master node, at least a portion of the computer memory available for allocation on the slave node in dependence upon the memory allocation request (702) for the application and the available memory notification (706) from the slave node; and transferring (720), by the master node, contents (630) of a portion of the computer memory on the master node to the allocated portion of the computer memory on the slave node. The example of FIG. 9 is also similar to the example of FIG. 7 in that the example of FIG. 9 includes a page table (610) for use by the master node in allocating (708) at least a portion of the computer memory available for allocation on the slave node. Each record of the page table (610) in FIG. 9 also includes a page number field (710), a frame number field (712), a node identifier field (714), a present bit field (716), and a dirty bit field (718).

In the method of FIG. 9, allocating (708), by the master node, at least a portion of the computer memory available for allocation on the slave node includes allocating (900) at least a portion of the computer memory available for allocation on each of two or more slave nodes in dependence upon the memory allocation request for the application and the available memory notification from each of the slave nodes. Allocating (900) at least a portion of the computer memory available for allocation on two or more slave nodes according to the method of FIG. 9 may be carried out in a similar manner as allocating a portion of the computer memory available for allocation on a single slave node except that the master node's page table (610) associates frames on multiple slave nodes with the pages assigned to an application or other process executing on the master node.

In the method of FIG. 9, transferring (720), by the master node, contents (630) of a portion of the computer memory on the master node to the allocated portion of the computer memory on the slave node includes transferring (904) the contents to the allocated portions of computer memory on the slaves nodes in dependence upon a distributed storage algorithm (902). The distributed storage algorithm (902) of FIG.

9 represents an algorithm capable of storing data across more than one independent storage devices. The distributed storage algorithm (902) of FIG. 9 is capable of striping, or 'splitting,' data across multiple memory devices and error correction in which redundant data is stored on one or more of the memory devices to allow data errors to be detected and possibly corrected. An example of a distributed storage algorithm that may be adapted for use in paging memory contents between a plurality of compute nodes in a parallel computer according to embodiments of the present invention include algorithms operating according to the various Redundant Array of Independent Disks ('RAID') standards.

The method of FIG. 9 also includes retrieving (908), by the master node, a portion (910) of the contents (630) transferred to the allocated portions of the computer memory on the slave nodes. In the example of FIG. 9, the master node retrieves (908) a portion (910) of the contents (630) transferred to the slaves nodes (906) by retrieving the portion (910) of the contents (630) stored on three of the four slave nodes (906) illustrated in FIG. 9.

The method of FIG. 9 also includes reconstructing (912), by the master node, a remaining portion (914) of the transferred contents (630) according to the distributed storage algorithm (902). The master node may reconstruct (912) the remaining portion (914) of the transferred contents (630) according to the method of FIG. 9 by recreating the remaining portion (914) not retrieved from the slave nodes (906) using the retrieved portion (910) of the contents (630), which contains enough redundant information regarding the contents (630) not retrieved from the slave nodes (906) that the master node can recreate the remaining portion (914) of the contents (630).

Readers will recall from above that a master node may request an available memory notification from one or more slave nodes to identify which nodes among possible slave nodes in the network that the master node may store some of its memory contents. In some embodiments, a slave node may not have any unallocated memory to make available to the master node. The slave node may therefore attempt to appropriate some of the computer memory from other nodes in the network in order that the slave node may satisfy the memory needs of the master node. In this manner, the slave node essentially becomes a 'master node' and attempts to utilize computer memory on another compute node to store information on the slave node's behalf. For further explanation, FIG. 10 sets forth a flow chart illustrating a further exemplary method for paging memory contents between a plurality of compute nodes in a parallel computer according to embodiments the present invention.

Figure 10:
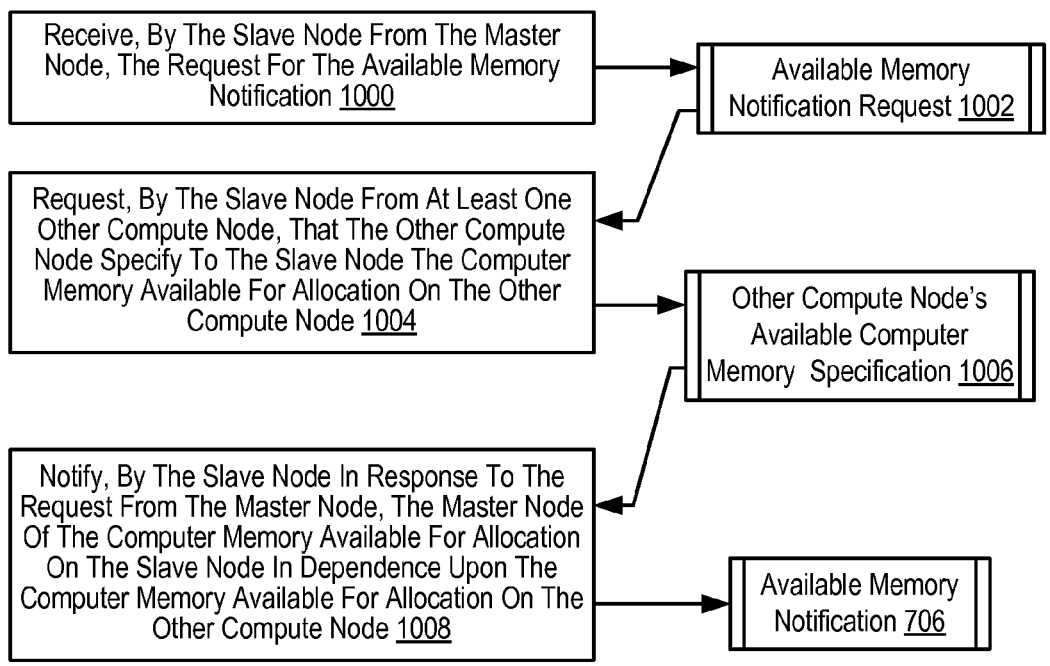
FIG. 10 sets forth a flow chart illustrating a further exemplary method for paging memory contents between a plurality of compute nodes in a parallel computer according to embodiments the present invention.

The method of FIG. 10 includes receiving (1000), by the slave node from the master node, the request (1002) for the available memory notification (706). The slave node may receive (1000) the request (1002) for the available memory notification (706) from the master node according to the method of FIG. 10 as part of a broadcast operation initiated by the master node. An example of a broadcast operation may include an 'MPI_BCAST' collective broadcast operation as specified by the MPI family of specifications.

The method of FIG. 10 also includes requesting (1004), by the slave node from at least one other compute node, that the other compute node specify to the slave node the computer memory available for allocation on the other compute node. The other compute node's available memory specification (1006) of FIG. 10 is similar to the available memory notifications described above that the slave node provides the master node. The other compute node's available memory specification (1006) represents the other node's description of the computer memory on the other node that is available for allocation. The slave node may request (1004) that the other compute node specify to the slave node the computer memory available for allocation on the other compute node according to the method of FIG. 10 in the same manner that the master node requests the available memory notification from the slave node. That is, the slave node may utilize a broadcast operation may include an 'MPI_BCAST' collective broadcast operation as specified by the MPI family of specifications.

The method of FIG. 10 includes notifying (1008), by the slave node in response to the request from the master node, the master node of the computer memory available for allocation on the slave node in dependence upon the computer memory available for allocation on the other compute node. The slave node may notify (1008), in response to the master node's request, the master node of the computer memory available for allocation on the slave node according to the method of FIG. 10 by identifying the frames available for allocation on the other node using the other node's available memory specification (1006), selecting the same number of frames on the slave node for allocation to the master node, and sending the master node a list of the selected frames in the available memory notification (706) using an 'MPI_SEND' point to point operation. In this manner, should the master node utilize memory on the slave node, the slave node may free up those selected frames on the slave node by moving the frame contents to the other node. Allowing the slave nodes to utilize memory on other compute nodes—such that the slave nodes essentially become master nodes themselves—provides additional flexibility for the system to satisfy the memory requirements of the initial master node.

Exemplary embodiments of the present invention are described largely in the context of a fully functional parallel computer system for paging memory contents between a plurality of compute nodes in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of paging memory contents between a plurality of compute nodes in a parallel computer, the plurality of compute nodes connected together for data communications using a data communications network, each compute node comprising computer memory, at least one of the compute nodes operating as a master node, and at least of the compute nodes operating as a slave node, the method comprising:

identifying, by the master node, a memory allocation request for an application executing on the master node, the memory allocation request requesting additional computer memory for use by the application during execution;

requesting, by the master node from at least one of the slave nodes, an available memory notification specifying to the master node the computer memory available for allocation on the slave node;

allocating, by the master node, at least a portion of the computer memory available for allocation on the slave node in dependence upon the memory allocation request for the application and the available memory notification from the slave node; and transferring, by the master node, contents of a portion of the computer memory on the master node to the allocated portion of the computer memory on the slave node.

2. The method of claim 1 wherein:

allocating, by the master node, at least a portion of the computer memory available for allocation on the slave node further comprises allocating at least a portion of the computer memory available for allocation on each of two or more slave nodes in dependence upon the memory allocation request for the application and the available memory notification from each of the slave nodes;

transferring, by the master node, contents of a portion of the computer memory on the master node to the allocated portion of the computer memory on the slave node further comprises transferring the contents to the allocated portions of computer memory on the slaves nodes in dependence upon a distributed storage algorithm; and the method further comprises: retrieving, by the master node, a portion of the contents transferred to the allocated portions of the computer memory on the slave nodes and reconstructing, by the master node, a remaining portion of the transferred contents according to the distributed storage algorithm.

3. The method of claim 1 wherein allocating, by the master node, at least a portion of the computer memory available for allocation on the slave node in dependence upon the memory allocation request for the application and the available memory notification from the slave node further comprises allocating at least a portion of the computer memory available for allocation on the slave node in dependence upon the memory allocation request for the application, the available memory notification from the slave node, and a network topology for the data communications network.

4. The method of claim 1 further comprising:

receiving, by the slave node from the master node, the request for the available memory notification;

requesting, by the slave node from at least one other compute node, that the other compute node specify to the slave node the computer memory available for allocation on the other compute node; and notifying, by the slave node in response to the request from the master node, the master node of the computer memory available for allocation on the slave node in dependence upon the computer memory available for allocation on the other compute node.

5. The method of claim 1 further comprises deallocating, by the master node, the allocated portion of the computer memory on the slave node.

6. The method of claim 1 wherein the plurality of compute nodes are connected together for data communications using a plurality of data communications networks, at least one of the data communications networks optimized for point to point operations, and at least one of the data communications networks optimized for collective operations.

7. A parallel computer for paging memory contents between a plurality of compute nodes, the plurality of compute nodes connected together for data communications using a data communications network, at least one of the compute nodes operating as a master node and at least one of the compute nodes operating as a slave node, each compute node comprising one or more computer processors and computer memory operatively coupled to the computer processors, the computer memory having disposed within it computer program instructions capable of:

identifying, by the master node, a memory allocation request for an application executing on the master node, the memory allocation request requesting additional computer memory for use by the application during execution;

requesting, by the master node from at least one of the slave nodes, an available memory notification specifying to the master node the computer memory available for allocation on the slave node;

allocating, by the master node, at least a portion of the computer memory available for allocation on the slave node in dependence upon the memory allocation request for the application and the available memory notification from the slave node; and transferring, by the master node, contents of a portion of the computer memory on the master node to the allocated portion of the computer memory on the slave node.

8. The parallel computer of claim 7 wherein:

allocating, by the master node, at least a portion of the computer memory available for allocation on the slave node further comprises allocating at least a portion of the computer memory available for allocation on each of two or more slave nodes in dependence upon the memory allocation request for the application and the available memory notification from each of the slave nodes;

transferring, by the master node, contents of a portion of the computer memory on the master node to the allocated portion of the computer memory on the slave node further comprises transferring the contents to the allocated portions of computer memory on the slaves nodes in dependence upon a distributed storage algorithm; and the computer memory has disposed within it computer program instructions capable of: retrieving, by the master node, a portion of the contents transferred to the allocated portions of the computer memory on the slave nodes and reconstructing, by the master node, a remaining portion of the transferred contents according to the distributed storage algorithm.

9. The parallel computer of claim 7 wherein allocating, by the master node, at least a portion of the computer memory available for allocation on the slave node in dependence upon the memory allocation request for the application and the available memory notification from the slave node further comprises allocating at least a portion of the computer memory available for allocation on the slave node in dependence upon the memory allocation request for the application, the available memory notification from the slave node, and a network topology for the data communications network.

10. The parallel computer of claim 7 wherein the computer memory has disposed within it computer program instructions capable of:
- receiving, by the slave node from the master node, the request for the available memory notification;
- requesting, by the slave node from at least one other compute node, that the other compute node specify to the slave node the computer memory available for allocation on the other compute node; and
- notifying, by the slave node in response to the request from the master node, the master node of the computer memory available for allocation on the slave node in dependence upon the computer memory available for allocation on the other compute node.

11. The parallel computer of claim 7 wherein the computer memory has disposed within it computer program instructions capable of deallocating, by the master node, the allocated portion of the computer memory on the slave node.

12. The parallel computer of claim 7 wherein the plurality of compute nodes are connected together for data communications using a plurality of data communications networks, at least one of the data communications networks optimized for point to point operations, and at least one of the data communications networks optimized for collective operations.

13. A computer program product for paging memory contents between a plurality of compute nodes in a parallel computer, the plurality of compute nodes connected together for data communications using a data communications network, each compute node comprising computer memory, at least one of the compute nodes operating as a master node, and at least of the compute nodes operating as a slave node, the computer program product stored on a computer readable medium, the computer program product comprising computer program instructions capable of:
- identifying, by the master node, a memory allocation request for an application executing on the master node, the memory allocation request requesting additional computer memory for use by the application during execution;
- requesting, by the master node from at least one of the slave nodes, an available memory notification specifying to the master node the computer memory available for allocation on the slave node;
- allocating, by the master node, at least a portion of the computer memory available for allocation on the slave node in dependence upon the memory allocation request for the application and the available memory notification from the slave node; and
- transferring, by the master node, contents of a portion of the computer memory on the master node to the allocated portion of the computer memory on the slave node.

14. The computer program product of claim 13 wherein:
- allocating, by the master node, at least a portion of the computer memory available for allocation on the slave node further comprises allocating at least a portion of the computer memory available for allocation on each of two or more slave nodes in dependence upon the memory allocation request for the application and the available memory notification from each of the slave nodes;
- transferring, by the master node, contents of a portion of the computer memory on the master node to the allocated portion of the computer memory on the slave node further comprises transferring the contents to the allocated portions of computer memory on the slaves nodes in dependence upon a distributed storage algorithm; and
- the computer program product further comprises computer program instructions capable of: retrieving, by the master node, a portion of the contents transferred to the allocated portions of the computer memory on the slave nodes and reconstructing, by the master node, a remaining portion of the transferred contents according to the distributed storage algorithm.

15. The computer program product of claim 13 wherein allocating, by the master node, at least a portion of the computer memory available for allocation on the slave node in dependence upon the memory allocation request for the application and the available memory notification from the slave node further comprises allocating at least a portion of the computer memory available for allocation on the slave node in dependence upon the memory allocation request for the application, the available memory notification from the slave node, and a network topology for the data communications network.

16. The computer program product of claim 13 further comprising computer program instructions capable of:
- receiving, by the slave node from the master node, the request for the available memory notification;
- requesting, by the slave node from at least one other compute node, that the other compute node specify to the slave node the computer memory available for allocation on the other compute node; and
- notifying, by the slave node in response to the request from the master node, the master node of the computer memory available for allocation on the slave node in dependence upon the computer memory available for allocation on the other compute node.

17. The computer program product of claim 13 further comprising computer program instructions capable of deallocating, by the master node, the allocated portion of the computer memory on the slave node.

18. The computer program product of claim 13 wherein the plurality of compute nodes are connected together for data communications using a plurality of data communications networks, at least one of the data communications networks optimized for point to point operations, and at least one of the data communications networks optimized for collective operations.

19. The computer program product of claim 13 wherein the computer readable medium comprises a recordable medium.

* * * * *